United States Patent [19]

Hewitt

[11] Patent Number: 5,317,944

[45] Date of Patent: * Jun. 7, 1994

[54] ADJUSTABLE PROTECTING GUARD APPARATUS FOR A BLADE OF A TABLE SAW

[76] Inventor: Timothy Hewitt, P.O. Box 839, Royal Oak, Mich. 48068-0839

[*] Notice: The portion of the term of this patent subsequent to Jan. 26, 2010 has been disclaimed.

[21] Appl. No.: 8,651

[22] Filed: Jan. 25, 1993

Related U.S. Application Data

[63] Continuation of Ser. No. 674,165, Mar. 25, 1991, Pat. No. 5,181,447.

[51] Int. Cl.$^5$ .............................................. B27G 19/02
[52] U.S. Cl. .................................... 83/447; 83/477.2; 83/478; 83/520; 83/860; 83/DIG. 1
[58] Field of Search ..................... 83/447, 477.2, 478, 83/520, 860, DIG. 1

[56] References Cited

U.S. PATENT DOCUMENTS

| | | | |
|---|---|---|---|
| 302,041 | 7/1884 | Sill | 83/478 |
| 1,126,970 | 2/1915 | Folmer | 83/478 |
| 1,255,886 | 2/1918 | Jones | 83/478 |
| 1,311,508 | 7/1919 | Harrold | 83/800 |
| 1,526,128 | 2/1925 | Flohr | 83/478 |
| 1,993,219 | 3/1935 | Merrigan | 83/478 |
| 3,105,530 | 10/1963 | Peteson | 83/478 |
| 3,249,134 | 5/1966 | Vogl et al. | 83/478 |
| 3,315,716 | 4/1967 | Mytinger | 83/478 |
| 3,880,032 | 4/1975 | Green | 83/102.1 |
| 3,949,636 | 4/1976 | Ball et al. | 83/478 |
| 4,033,218 | 7/1977 | Donatelle | 83/478 |
| 4,517,869 | 5/1985 | Kuhlmann et al. | 83/100 |
| 4,625,604 | 12/1986 | Handler | 83/102.1 |
| 4,875,398 | 10/1989 | Taylor et al. | 83/478 |
| 5,181,447 | 1/1993 | Hewitt | 83/447 |

*Primary Examiner*—Hien H. Phan
*Attorney, Agent, or Firm*—Gifford, Groh, Sprinkle, Patmore and Anderson

[57] ABSTRACT

An adjustable protecting guard apparatus for a table saw having a guard positionable over the saw blade. The adjustable protection guard apparatus has a telescoping arm extending from one end of the saw table which supports a guard superstructure. A hinged connection on an edge of the guard superstructure permits the guard superstructure and the attached guard to pivot up and away from the saw blade. A control module simultaneously deactivates the motor rotating the saw blade with the pivoting of the guard superstructure. The control module has a multi-position key switch having a by-pass position permitting pivoting of the guard without de-energizing the motor. This permits difficult cuts to be made which would not be feasible with the guard in place. An anti-kickback pawl is also provided within the guard and prevents the saw from rejecting a workpiece in a direction opposite to its feed direction.

11 Claims, 5 Drawing Sheets

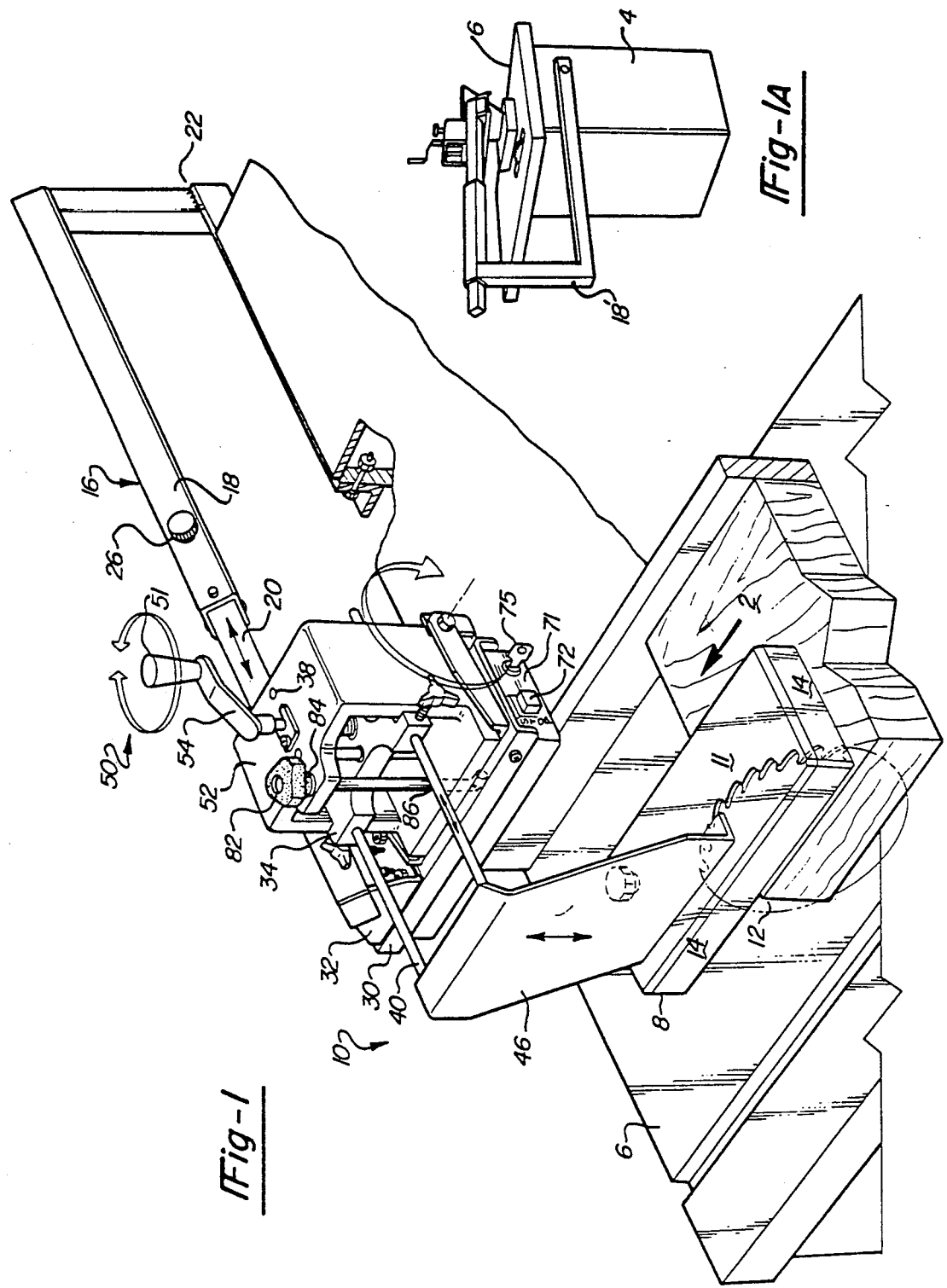

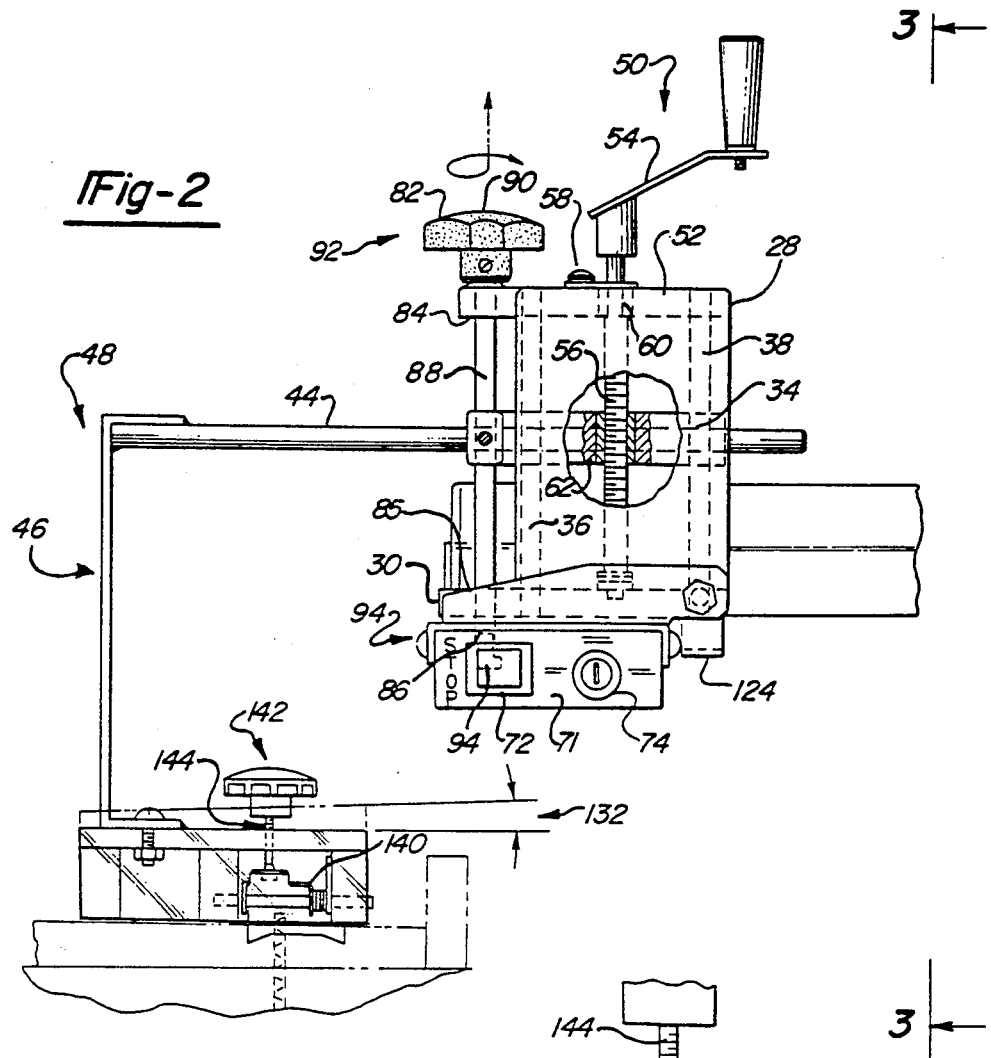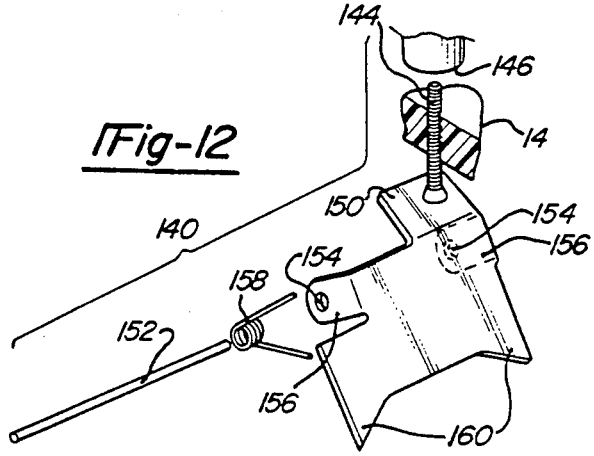

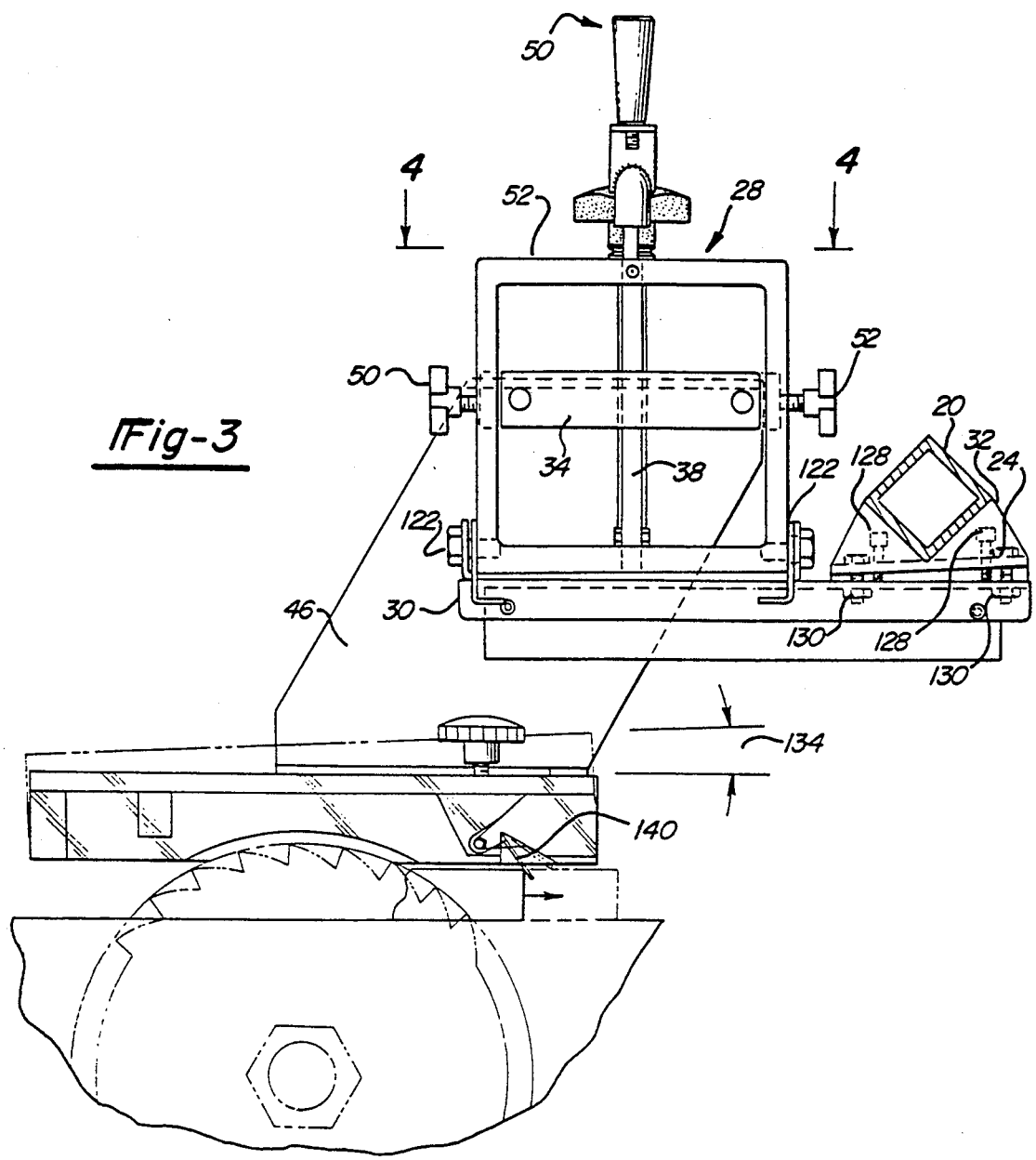
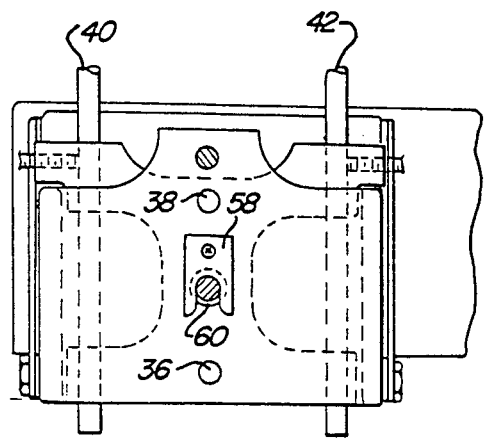
Fig-3
Fig-4

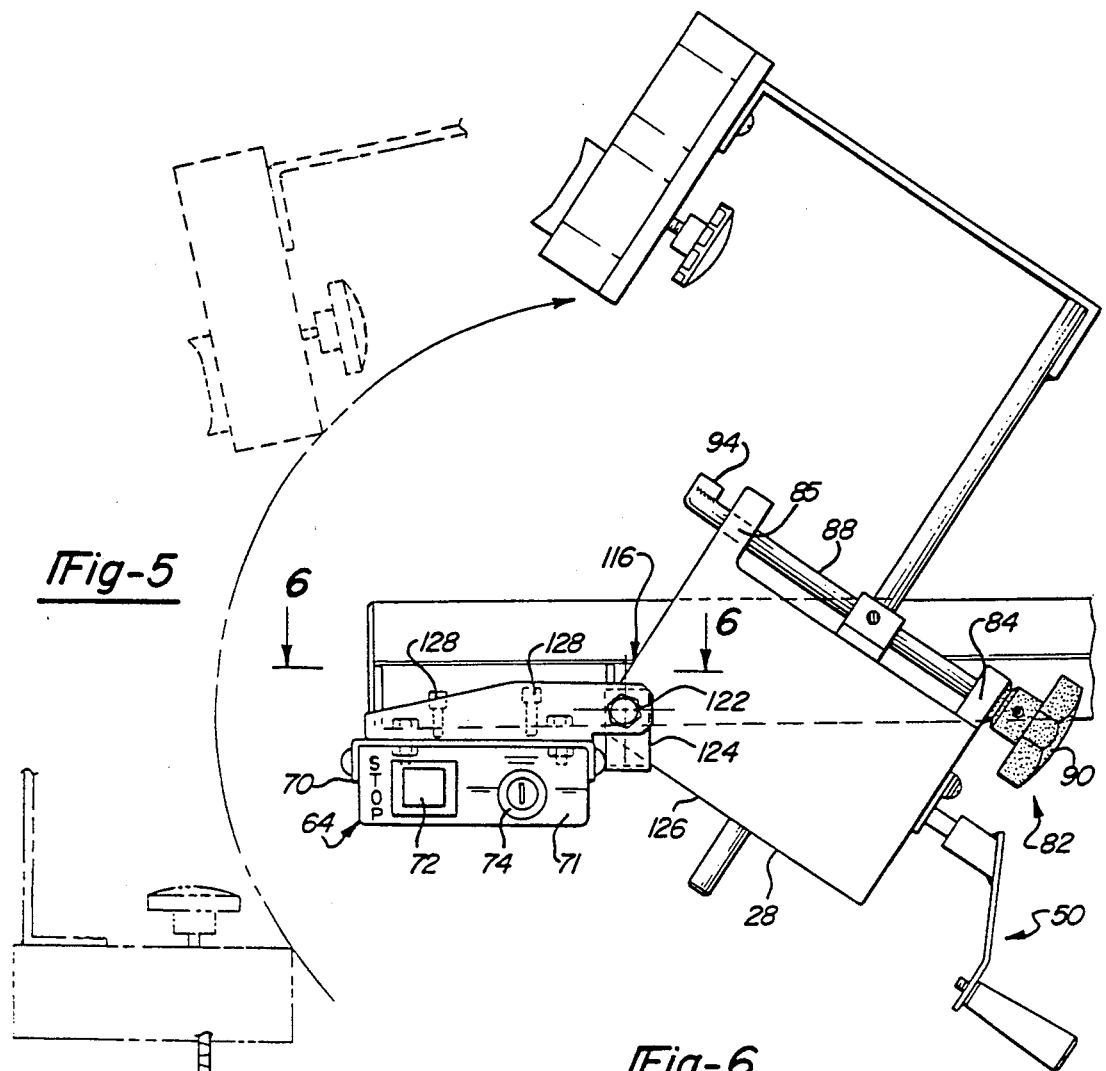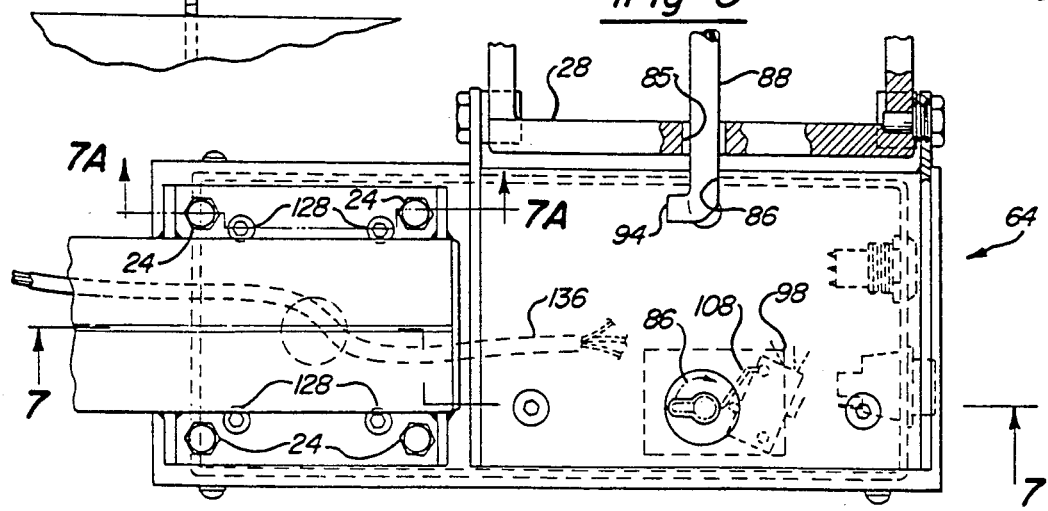

ADJUSTABLE PROTECTING GUARD APPARATUS FOR A BLADE OF A TABLE SAW

This is a continuation of copending application Ser. No. 07/674,165 filed Mar. 25, 1991, now U.S. Pat. No. 5,181,447.

BACKGROUND OF THE INVENTION

I. Field of the Invention

The present invention relates to a saw guard, and more particularly to an adjustable protecting guard for a table saw.

II. Description of the Prior Art

Protective guards for table saw blades are known in the art. The concept of the guard which is pivotably movable away from a blade is known, and is illustrated in U.S. Pat. No. 302,041 issued to Sill. Also known in the art are saw guards with a transparent structure as is shown in U.S. Pat. No. 3,949,636 issued to Ball et al and U.S. Pat. No. 4,625,604 issued to Handler et al.

These prior art however do not show a saw guard which is pivotal relative to a telescoping supporting bracket extending across a saw table and over a workpiece to be cut. Also not shown is a table saw guard with a multi-position key-switch and a bypass which allows the saw to continue operating when the guard is in a retracted and away position so as to permit difficult sawing operations to be undertaken.

The prior art further does not disclose a device for preventing kickback of the workpiece by the saw blade during sawing which is integrally built into a protecting saw guard.

SUMMARY OF THE PRESENT INVENTION

The present invention provides an adjustable protecting guard apparatus for a table saw which overcomes the above-mentioned disadvantages of the prior art devices.

The adjustable protecting guard apparatus of the present invention comprises a guard positioned to overlie the saw blade of a table saw at a point where the saw blade protrudes above the work surface of the table saw. The guard is of a durable transparent construction and permits accurate guiding by the user of the workpiece to be cut. A guard superstructure is provided and is attached to the end of a telescoping arm. Supporting members extending from the guard superstructure support the guard over the saw blade. The supporting members include a pair of support arms and a downwardly-extending support bracket connecting the guard to the guard superstructure.

A pivot connection is provided between the guard superstructure and a support bracket attached to the end of the telescoping arm. The guard may be pivoted away from the saw blade for certain sawing operations when the guard in its normal position would hinder the desired cutting operation. Under normal operating conditions a microswitch associated with the pivot connection causes automatic shut-off of the motor rotating the saw blade upon pivoting of the guard from over the saw blade. A multi-position keyswitch is further provided having a bypass position which permits the guard to be pivoted away without deactivation of the saw table's motor. Furthermore, the key cannot be removed when in the bypass position when the guard is in a pivoted position. An anti-kickback pawl is built into an underside of the guard and prevents the saw blade from rejecting a workpiece in a direction towards the user.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view of the adjustable protecting guard apparatus of the present invention;

FIG. 1a is a perspective view of an alternately configured supporting bracket of the protecting guard apparatus of the present invention;

FIG. 2 is a frontal view of the protecting guard apparatus of the present invention;

FIG. 3 is a side view taken along line 3—3 of FIG. 2;

FIG. 4 is a top view taken along line 4—4 of FIG. 3;

FIG. 5 is a view similar to that shown in FIG. 2 and further showing the pivotal characteristics of the protecting guard apparatus of the present invention;

FIG. 6 is a cut-away view taken along lines 6—6 of FIG. 5;

FIG. 12 is an exploded view of the anti-kickback device of the protecting guard of the present invention; and FIG. 13 is an end view of the anti-kickback device shown in FIG. 12 showing the pivotal characteristics of the anti-kickback device.

DETAILED DESCRIPTION OF THE PREFERRED EMBODIMENT OF THE PRESENT INVENTION

Figures 7, 7B, 8, 9, 10, 11:
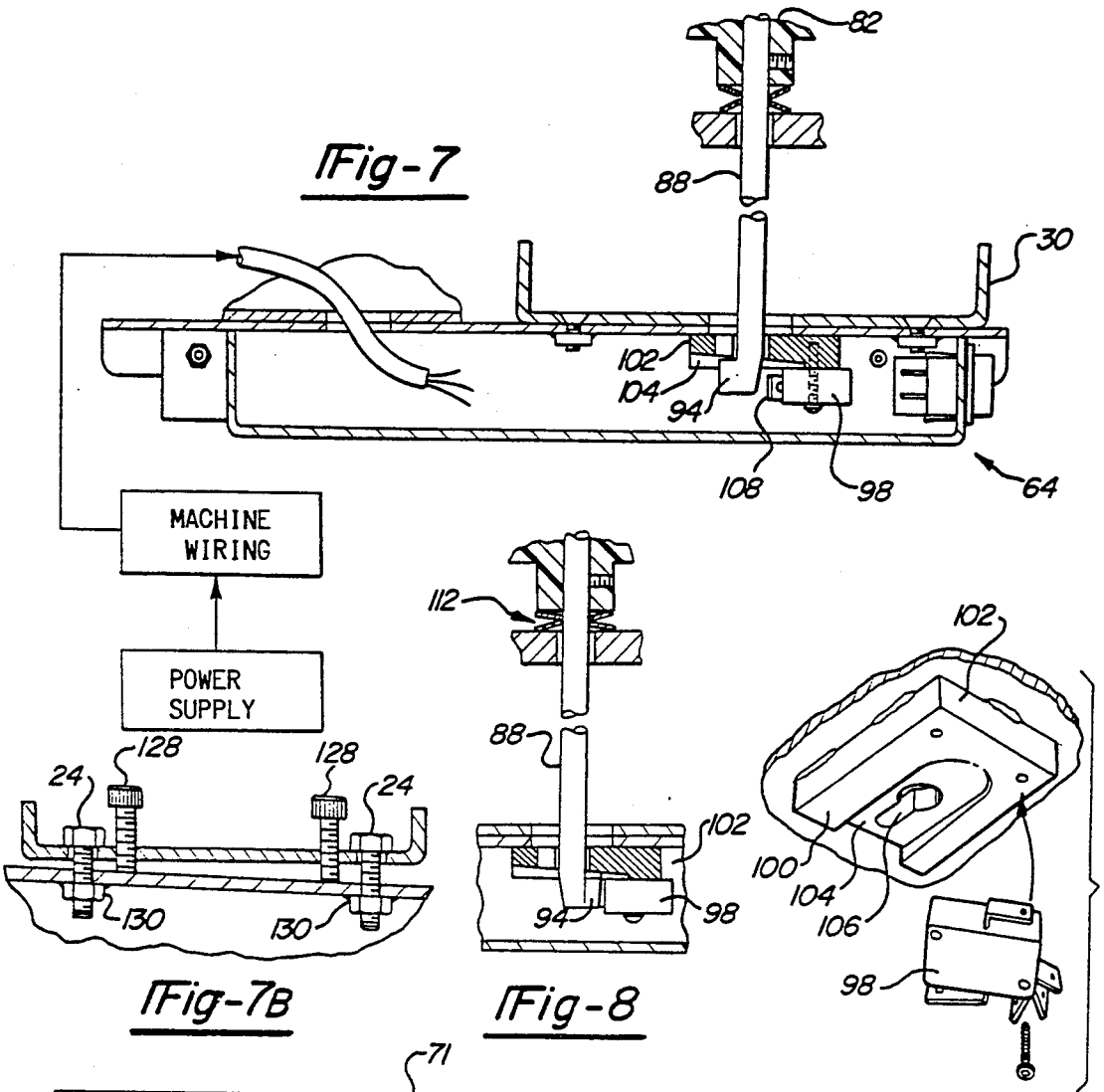
FIG. 7 is a cut-away view taken along lines 7—7 of FIG. 6.
FIG. 7b is a sectional view of the adjusting bolts of the guard of the present invention.
FIG. 8 is a sectional view of the locking rod of the adjustable protecting guard of the present invention.
FIG. 9 is an exploded view of the microswitch of the adjustable protecting guard of the present invention.
FIG. 10 is a sectional view of the three-position keyswitch of the protecting guard of the present invention.
FIG. 11 is a block diagram of the electrical circuit of the protecting guard of the present invention.

Referring to FIG. 1, a preferred embodiment of the adjustable protecting guard apparatus 10 for a blade of a rotary saw is shown. The protecting guard apparatus 10 has a guard 8 positioned to overlie a blade 12 of a table saw. The guard 8 is preferably rectangular in shape and further has an upper face 11 and downwardly extending side members 14. In a preferred embodiment, the guard 8 is of a transparent construction as to permit visual observation of the sawing operation taking place. The guard 8 is positionable to overlie the saw blade 12 of the table saw 6 at such a height so as to permit a workpiece 2 to be fed underneath.

A telescoping arm 16 supports the guard 8 in position above the saw blade 12. The telescoping arm 16 is constructed from an L-shaped first tubular member 18 and a second 20 tubular member. The first tubular member 18 is attachable to an edge 22 of the saw table and extends above and across the work surface of the saw table as shown. The second tubular member 20 is telescopically inserted within the first member 18 and is slidably extendable in a direction normal to the face of the saw blade 12. Referring to FIG. 3, brackets 32 are attached near the end of the second tubular member 20.

The brackets 32 are fastened to a horizontal base 30 by bolts 24 or any other means known in the art. The second tubular member 20 is horizontally adjustable within the first tubular member 18 and locative therein by means of a locking knob 26 located at a point where both first 18 and second 20 tubular members are coaxial.

In an alternative embodiment, as shown in FIG. 1A, the first tubular member indicated as tubular member 18' is a substantially U-shaped and is attachable to a cabinet 4 of the saw table 6.

Referring to FIGS. 1–3 and 5, a guard superstructure 28 is attached upon the horizontal base 30. The guard superstructure 28 has a generally rectangular shape about an open interior. A guide plate 34 is movably supported within the interior of the guard superstructure 28 by means of first 36 and second 38 support rods extending vertically within the open interior of the guard superstructure 28 and supported at upper and lower ends thereof, as shown in FIGS. 2 and 4. First support arm 40 and second support arm 42 extend horizontally through the guide plate 34. A downwardly-extending support bracket 46 is attached to the ends of support arms 40 and 42 as shown. The downwardly-extending support bracket 46 is secured to the top surface of the guard 8 by bolts, screws, or other means known in the art. A pair of locking knobs 50 and 52 are provided on the edges of the guide plate 34 which permit the support arms 40 and 42 and guard body 8 to be locked to the guide plate 34.

A height adjustment crank 50 is further provided and extends above a top surface 52 of the guard superstructure 28. The crank 50 has a crank handle 51 connected to crank arm 54 which is attached a threaded vertical shaft 56. Referring to FIG. 4, a guide or keeper 58 secures the threaded shaft 56 to the guard superstructure 28 and prohibits vertical displacement of the vertical crank 50 relative to the superstructure 28. The threaded shaft 56 further extends vertically through the guide plate 34 at a central position thereof. The guide plate has an internally threaded nut 62 which is threadably engaged by threaded shaft 56 of the height adjustment crank 50. Rotation of the height adjustment crank 50 in a first direction results in raising the guide plate 34 and guard 8 and rotation of the height adjustment crank in the opposite direction results in lowering the guide plate 34 and the guard 8 by means of the structural connections indicated above. In this manner the guard 8 may be horizontally and vertically adjusted to optimize its position above the saw blade 12 and workpiece 2 to be cut.

Referring to FIGS. 5 through 7, a circuit module 64 is attached to a bottom surface of the base 30. The opposing sides of the circuit module 64 are attached to mounting flanges 70 of the base 30 and suspended beneath the base 30. A front face 71 of the circuit module 64 is provided with a stop button 72 and a multi-position key switch 74. Referring to FIG. 10, the key switch 74 is rotatable between a lockoff position 76, a bypass position 78, and an interlock position 80. The significance of the three key switch positions 76–80 will be discussed hereinafter.

Referring to FIG. 2, a locking rod 82 extends through apertures 84 and 85 provided in the top and bottom of the guard superstructure 28, as well as through an aperture 86 provided in the top surface of the circuit module 64. The locking rod 82 has a stem 88, a knob 90 attached to the upper end 92 of the stem 88 and a dog 94 provided at a lower end 96 of stem 88. Referring to FIGS. 6 through 9 a microswitch 98 is provided within the circuit module 64 and affixes to a bottom face 100 of a cam guide 102. The cam guide 102 is in turn affixed to an inside surface of the circuit module 64, as shown in FIG. 7. The cam guide 102 is further provided with a tapered surface 104 through which is formed an aperture 106 for the locking rod 82 as shown in FIG. 9. A tang 108 extends from the microswitch 98 and is contacted by the dog 94 of the locking rod 82 when the locking rod 82 is in a locked position, as is shown in FIG. 8. When the locking rod 82 is in the locked position a pair of spring washers 112 located between the top surface of the guard superstructure 28 and the base of the knob 90 are compressed and the dog 94 is forceably engaged with the taper surface 104 of the cam guide 102 to lock the guard superstructure 28 to the support bracket 30. When in an opened position, as shown in FIG. 7, the dog 94 of the locking rod 82 is disengaged from the tang 108 of the microswitch 98. In this state, microswitch 98 terminates the power being delivered to the table saw's motor when the key switch 74 is in the interlocked position. When the locking rod 82 is in the unlocked position, the guard super-structure may be pivoted on the support bracket as shall be explained below.

Referring again to FIG. 5, a hinged connection 116 is provided between the lower edge of the guard superstructure 28 opposite the guard 8 and the base 30. The guard superstructure 28 is hinged to the base by bolts 122 or other suitable fasteners as shown in FIG. 3. When the locking rod 82 is in the unlocked position, the guard superstructure 28 and the guard 8 may be pivoted away from the saw blade 12, as is shown in FIG. 5.

In order for the saw to continue operating when the table saw guard superstructure 28 is pivoted as shown in FIG. 5, the key switch 74 must be set in the bypass position 78. In the bypass position 78 the key 75 cannot be removed from the key switch 74, thus requiring the presence of the key 75 inserted in the key switch 74 when the guard superstructure 28 is in the pivoted position. In this manner, the sawing operations which require that the guard 8 be pivoted away from the workpiece 2 may be undertaken only when supervisory authority in possession of the key 75 is present.

Stop members 124 are attached to the side of the mounting flanges 70 of base 30. The stop members 124 engage an edge 126 the guard superstructure 28 and support it in its pivoted overhead position.

Referring to FIGS. 3 and 7b, a plurality of adjusting bolts 128 are provided. The adjusting bolts 128 are disposed between the bracket 32 fastened to the second tubular member 20 and the base 30 upon which the guard superstructure 28 is supported. The purpose of the adjusting bolts 128 is to overcome cantilevering effects which are inherent in an overhead suspended protection guard. In a preferred embodiment, pairs of adjusting bolts 128 are positioned in the manner indicated above and are complemented by the bolts 24 disclosed above with securing nuts 130 for adjustably supporting the base 30 relative to the bracket 32 attached to the second tubular member 18. In this manner, the guard superstructure 28 of the present invention is adjustable so that the guard 8 rests squarely on the workpiece 2. Referring also to FIGS. 2 and 3, adjustment capability of the adjustment bolts 128 are indicated by the transverse and longitudinal angles 132 and 134 of the guard 8 relative to the plane of the surface of the table saw 6.

Referring to FIG. 11, a block diagram of the electrical circuit inside circuit module 64 is shown. An external power supply 134 is connected to the circuit module 64 by a pair of electrical lead wires 136 which extend between the saw motor 162 of the saw table and the circuit module 64, through the telescoping arm 16, in the fashion shown in FIG. 6. Referring to FIG. 11, the wiring 136 connects the power supply 134 to the stop button 72. The stop button 72 is connected to the key switch 74. The key switch 74 in the lock-off position 76 terminates the power to the saw motor 162 rotating the saw blade 12. When the key switch 74 is in the interlocked position 80, the locking rod 82 must be in the locked position 110 to close the contacts of microswitch 98 in order to provide electrical power to the saw motor. The bypass position 114, as previously discussed, bypasses the microswitch 98 and provides electrical power to the saw motor 162 when dog 94 of the locking rod 82 is disengaged from the microswitch 98. In this state the guard superstructure 28 and the guard body 8 may be pivoted up and away from the saw blade 12 permitting use of the table saw without the protection guard 8 as previously described.

Referring to FIGS. 2, 3, 12 and 13 an anti-kickback pawl 140 is shown. The anti-kickback pawl 140 fastens to one of the side 14 of the guard 8. A pawl adjustment knob 142 is disposed external to upper face 11 of the guard 8 and is connected to a threaded screw 144 extending through a threaded aperture in the guard 8. The internal end 148 of the threaded screw 144 contacts a tab 150 provided on the upper edge of the pawl 140. The pawl 140 is pivotally secured to the side 14 of the guard 8 by a pawl stem 152 which extends through openings 154 provided in opposing ears 156 of the pawl 140 and engages the side 14 of the guard 8. A spring 158 biases the pawl in a direction downward towards the workpiece 2. Lower edge of the pawl 140 has a pair of pointed teeth 140 which extend beneath the plane formed by the lower edges of the sides 14 of the guard 8. During sawing operations, if the blade 12 of the saw transfers forces to a workpiece in an opposing direction which exceed those forces generated in the direction of the feed, the teeth 160 of the pawl 140 will penetrate into the workpiece when its motional direction is reversed and will prevent the workpiece from being expelled in the direction of the user. In this fashion, injuries that might otherwise occur are prevented.

Having described my invention many embodiments will become apparent to those skilled in the art to which it pertains.

I claim:

1. An adjustable protecting guard apparatus for a saw blade of a table saw comprising:
   a guard positionable to overlie said saw blade of said table saw;
   a support arm affixed at one side of said table saw and extending above said saw blade and guard adjacent a blade plane of said saw blade;
   a horizontally disposed superstructure base attached adjacent to a free end of said support arm;
   a superstructure housing pivotally attached to a rear side of said base to extend over said base in a working position and to extend away from the blade plane and away from said base in a retracted position;
   a support bracket attached to said housing and said guard, supporting said guard forwardly of said base and said housing toward said blade plane in said working position overlying said saw blade; and
   said support bracket being movable relative to said housing for controlling the height of said guard with respect to said saw blade.

2. The protecting guard apparatus as described in claim 1, wherein said guard is constructed of a transparent material.

3. The protecting guard apparatus as described in claim 1, wherein said guard has a width sufficient to permit said saw blade to be pivoted up to 45 degrees either side of a vertical.

4. The protecting guard apparatus as described in claim 1, further comprising means for adjusting said guard to squarely engage a workpiece.

5. The protecting guard apparatus according to claim 1 including a guide plate vertically displaceable in said housing for controlling the height of said guard.

6. The protecting guard apparatus according to claim 5 including first and second vertical rods in said housing passing through said guide plate to slidably guide said guide plate.

7. The protecting guard apparatus according to claim 6 further comprising a threaded rod in said housing passing through a threaded portion of said guide plate and a crank arm attached to said threaded rod for vertically displacing said guide plate along said first and second guide rods by rotation of said crank.

8. The protecting guard apparatus according to claim 5 including a pair of horizontally displaceable support legs slidably attached to said guide plate and attached to said support bracket.

9. The protecting guard apparatus according to claim 1 wherein said support arm is a telescoping arm permitting adjustment of said guard relative to said blade plane.

10. The protecting guard apparatus according to claim 1 further including an anti-kickback mechanism attached to said guard.

11. The protecting guard apparatus as described in claim 10, wherein said anti-kickback mechanism includes a pawl extending downwardly at an angle from said guard body, said pawl engaging a workpiece to be cut when said saw blade attempts to reject said workpiece in a direction opposite to a feed direction of said workpiece, said pawl preventing injury to a user by restraining said workpiece from being kicked back in a direction opposite to said feed direction.

* * * * *

UNITED STATES PATENT AND TRADEMARK OFFICE
CERTIFICATE OF CORRECTION

PATENT NO. : 5,317,944
DATED : June 7, 1994
INVENTOR(S) : Timothy Hewitt

It is certified that error appears in the above-indentified patent and that said Letters Patent is hereby corrected as shown below:

On title page, item [56], delete "Peteson" and insert

-- Peterson --;

Column 4, line 23, delete "super-structure" and insert -- superstructure --;

Column 4, line 27, delete "super-structure" and insert -- superstructure --.

Signed and Sealed this

Twenty-seventh Day of September, 1994

Attest:

BRUCE LEHMAN

Attesting Officer

Commissioner of Patents and Trademarks